United States Patent [19]

Moreau

[11] Patent Number: 4,543,522
[45] Date of Patent: Sep. 24, 1985

[54] REGULATOR WITH A LOW DROP-OUT VOLTAGE

[75] Inventor: Jean M. Moreau, Grenoble, France

[73] Assignee: Thomson-CSF, Paris, France

[21] Appl. No.: 553,482

[22] Filed: Nov. 18, 1983

[30] Foreign Application Priority Data

Nov. 30, 1982 [FR] France .............................. 82 20046

[51] Int. Cl.⁴ .............................................. G05F 5/00
[52] U.S. Cl. .................................... 323/303; 323/274;
307/44; 307/66
[58] Field of Search ................. 323/273–280,
323/299, 303, 901; 307/44–46, 48, 66

[56] References Cited

U.S. PATENT DOCUMENTS

| 3,414,802 | 12/1968 | Harrigan et al. | 307/44 X |
| 4,209,710 | 6/1980 | Quarton | 307/66 |
| 4,342,922 | 8/1982 | Dimassimo | 307/66 |
| 4,354,118 | 10/1982 | Spencer | 307/66 |

FOREIGN PATENT DOCUMENTS

| 2941546 | 1/1981 | Fed. Rep. of Germany . |
| 3044658 | 6/1982 | Fed. Rep. of Germany . |
| 2061642 | 5/1982 | United Kingdom . |

OTHER PUBLICATIONS

Valone, Thomas, "Protected Regulator has Lowest Dropout Voltage", Electronics/Apr. 24, 1980, p. 130.

Primary Examiner—Peter S. Wong
Attorney, Agent, or Firm—Roland Plottel

[57] ABSTRACT

A regulator with a low drop-out voltage receiving on a first terminal a supply voltage and supplying on its output terminal a regulated voltage. The input and output terminals are connected on the one hand, by a first branch incorporating a pnp transistor, and on the other hand by a second branch incorporating in series a resistor and a second pnp transistor, whose emitter is connected to a storage capacitor charged by the resistor. Thus, when the supply voltage drops below the charging voltage of the capacitor, it is the second pnp transistor which conducts and connects the capacitor to the output terminal.

7 Claims, 6 Drawing Figures

REGULATOR WITH A LOW DROP-OUT VOLTAGE

BACKGROUND OF THE INVENTION

The present invention relates to a voltage regulator with a low drop-out voltage, which can be linked with a power supply, which may be temporarily interrupted.

The present invention is more particularly intended for use in automobile electronics. There is an increasing tendency to use microprocessors in cars for controlling or supplying information. These microprocessors require a stable supply voltage, e.g. 5 V to within 0.25 V. However, car batteries which normally supply a voltage of approximately 12 to 14 V may, under certain circumstances, e g. during cold starts, be greatly discharged and supply low voltages of e.g. only 5.5 V. Moreover, the electrical environment of a car engine is greatly subject to interference and in circuits there can be high overvoltages up to 120 V in positive and negative peak values. When this is a negative peak value, this means that the power supply is interrupted. Fortunately, these interruption periods are brief and only last a few milliseconds.

FIG. 1 shows a simple example of a regulator, with a low drop-out voltage. This regulator, which receives a supply voltage $V_A$ between its input terminals 1 and 2, e.g. from a battery, supplies a use voltage $V_U$ between its output terminals 3 and 2, e.g. for a microprocessor. It essentially comprises a pnp transistor 4, whose emitter is connected to the input terminal 1 and whose collector is connected to the output terminal 3. The base of the pnp transistor 4 is supplied by a regulation control circuit 5. The latter comprises e.g. a differential amplifier 6 receiving on the one hand a reference voltage at its first input terminal 7, and on the other hand at its second input terminal 8 a signal from a divider bridge 9, 10, which converts the voltage present between output terminals 3 and 2. For example, when the use voltage must be 5 V, the supply voltage must drop to a value of 5 V+$V_{CEsat}$, $V_{CEsat}$ being the saturation collector-emitter voltage drop of the pnp transistor and which can be approximately 0.4 to 0.5 V, when the base voltage is suitable. Thus, the difference between the use voltage and the minimum supply voltage, i.e. the drop-out voltage of the regulator is well below 1 V, even when account is taken of the losses in the electrical wires.

Consideration will now be given to how it is possible to retain the advantages of a low voltage drop of the pnp transistor—equipped regulator, whilst making it possible to maintain the use voltage during the brief drops of the supply voltage below the threshold value.

Whilst using the same references as employed in FIG. 1 for the same components, FIGS. 2 and 3 illustrate attempts made in the prior art to achieve this aim.

In the case of FIG. 2, a storage capacitor 11 is placed between the supply terminals 1, 2 and a diode 12 prevents said capacitor from discharging towards the power supply. Thus, as soon as the voltage between terminals 1, 2 temporarily drops, the capacitor comes into action and supplies the circuit. This operates well with reasonable capacitance values of capacitor 11, when the power supply is normally at a high level and temporarily drops, e.g. for a few milliseconds to low values. However, this configuration does not enable the supply voltage to remain at values close to the use voltage for relatively long periods. Thus, the voltage drop in normal operation between terminals 1 and 3 consists, as hereinbefore, of the saturation collector - emitter voltage drop of the pnp transistor 4 ($V_{CEsat}$), but it is necessary to add thereto the voltage drop in diode 12 of approximately 0.6 to 0.8 V, which gives a total exceeding 1 V.

In order to obviate this disadvantage, the configuration of FIG. 3 is proposed, in which a storage capacitor 13 is placed between the use terminals. In this case, normal operation is satisfactory, because then the potential difference between the supply terminals 1 and 3 is only the collector - emitter voltage drop of transistor 4. However, the storage capacitor 13 is normally supplied at the use voltage, so that, necessarily, as soon as the supply voltage is interrupted, the voltage between the use terminals drops. For example, it is desired that this voltage cannot drop by more than 0.25 V. A simple calculation shows that in practice, for this purpose and if the voltage interruptions last a few milliseconds, values are obtained for the capacitor, which are prohibitive for a normal consumption of the integrated circuit, e.g. approximately 150 mA.

Thus, the prior art teaches us that regulators using storage capacitors have one or other of the two aforementioned disadvantages. Thus, either the drop-out voltage (minimum difference between the supply voltage and the use voltage) is too high, as in the case of FIG. 2, or it is necessary to provide capacitors having an excessively high value, which are expensive, have large overall dimensions and have poor thermal drift characteristics, as in FIG. 3.

SUMMARY OF THE INVENTION

It is therefore an object of the present invention to provide a regulator circuit with a low drop-out voltage and a storage capacitor, which obviates the two aforementioned disadvantages.

In order to achieve this and other objects, the present invention provides a voltage regulator, which can be linked with a power supply able to reach values very close to the sought voltage and which can even be temporarily interrupted, in which a pnp transistor is connected by its emitter to the source, supplies by its collector the desired voltage and receives at its base a regulation control voltage, wherein said regulator also comprises a second pnp transistor, whose collector is connected to that of the first transistor, whose base receives the control voltage and whose emitter is connected, on the one hand, to the supply voltage via a charging and optionally insulating means, and on the other hand to earth via a storage capacitor. This regulator can also have means for supplying an inhibition signal, when the capacitor is inadequately charged, or when a minimum delay has not elapsed after the application of the supply voltage.

BRIEF DESCRIPTION OF THE DRAWINGS

The invention is described in greater detail hereinafter relative to non-limitative embodiments and the attached drawings, wherein show.

DETAILED DESCRIPTION OF THE INVENTION

In all the drawings, the same references are used for designating similar elements.

Figure 1:
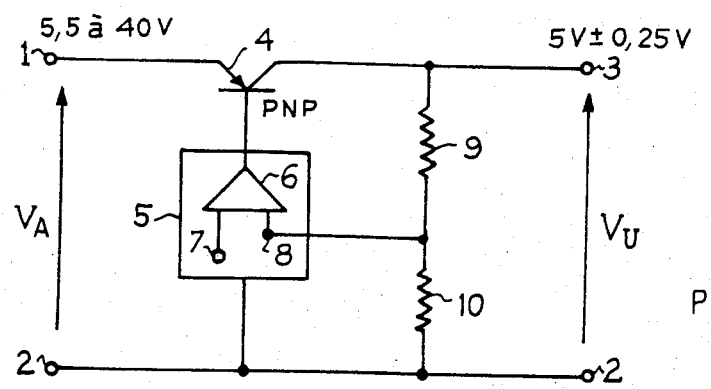
FIGS. 1 to 3 prior art regulators.
Figure 2:
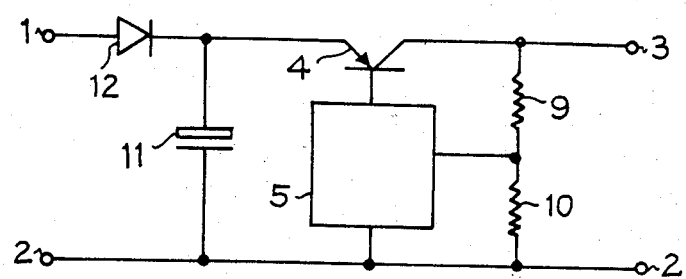
Figure 3:
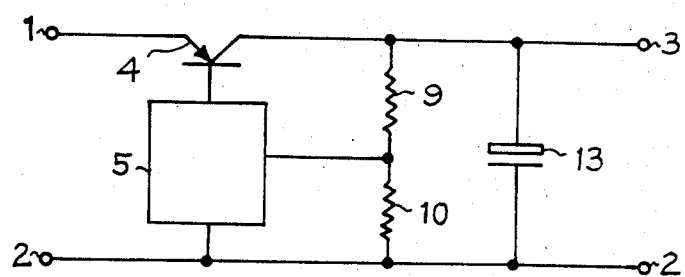
Figure 4:
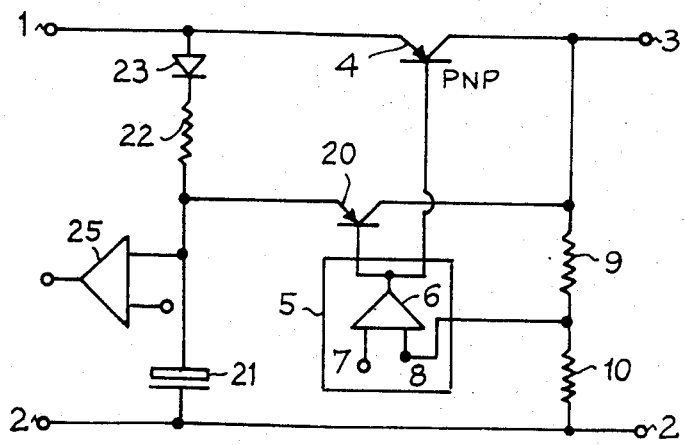
FIGS. 4 to 6 various embodiments of a regulator according to the present invention.

In the circuit of FIG. 4, which illustrates an embodiment of the present invention, it is possible to find the elements 1 to 10 already shown in FIG. 1. Apart from these elements, there is a second pnp transistor 20, similar to transistor 4, i.e. requiring substantially the same base control and which can permit the passage of the same use current. This transistor 20 is connected by its collector to the collector of transistor 4 and is supplied by its base in the same way as transistor 4. The emitter of transistor 20 is connected to a terminal of the storage capacitor 21, said terminal also being connected to the supply terminal 1 via a charging means, constituted e.g. by a resistor 22. If necessary, there is also provided an insulating means constituted e.g. by a diode 23, but generally the storage capacitor will not have sufficient time to discharge significantly during the brief voltage interruption.

The circuit according to FIG. 4 functions as follows. If the supply voltage at terminal 1 is adequate, the circuit functions in the same way as that of FIG. 1 and transistor 20 is not conductive. During this normal operating phase, the storage capacitor 21 is charged. Then, if the supply voltage drops and the voltage on the emitter of transistor 20 exceeds the voltage at the emitter of transistor 4, transistor 20 starts to conduct and discharges the storage capacitor 21 into the use circuit. Subsequently, and at all times, whichever of the transistors 4 and 20 has the highest emitter voltage will be in the conductive state.

This arrangement permits a very durable operation with supply voltages very close to the use voltage, whilst making it possible to use a capacitor 21 having reasonable dimensions in the case where, on the basis of a mean supply voltage of e.g. 12 to 14 V, brief voltage interruptions occur. For example, if the normal supply voltage of capacitor 21 is 13.5 V, the consumption of the use circuit 150 mA (0.15 A) and the use voltage thereof 5 V, by choosing a value of 47 $\mu$F for capacitor 21, the time required for the voltage to drop from 15 to 5.5 V, i.e. by 8.5 V is:

$$T = C \cdot V/I = 47 \cdot 10^{-6} \cdot 8.5/0.15 = 2.66 \text{ ms},$$

i.e. if the battery voltage was 14 V, it is possible to withstand a supply interruption of roughly 3 ms, without there being any change to the use voltage at the microprocessor terminals.

Moreover, in the case where the use circuit is a microprocessor, it is generally useful to inhibit its operation in the few moments following the energization. For this purpose, it is possible to use capacitor 21 as an element of a delay circuit able to supply an inhibition signal when the charge at the terminals of this capacitor is inadequate. For this purpose, it is possible to provide a comparator 25 receiving on one terminal the voltage at the terminals of capacitor 21 and at another terminal a reference voltage, whilst supplying an inhibition signal at the output.

Figure 5:
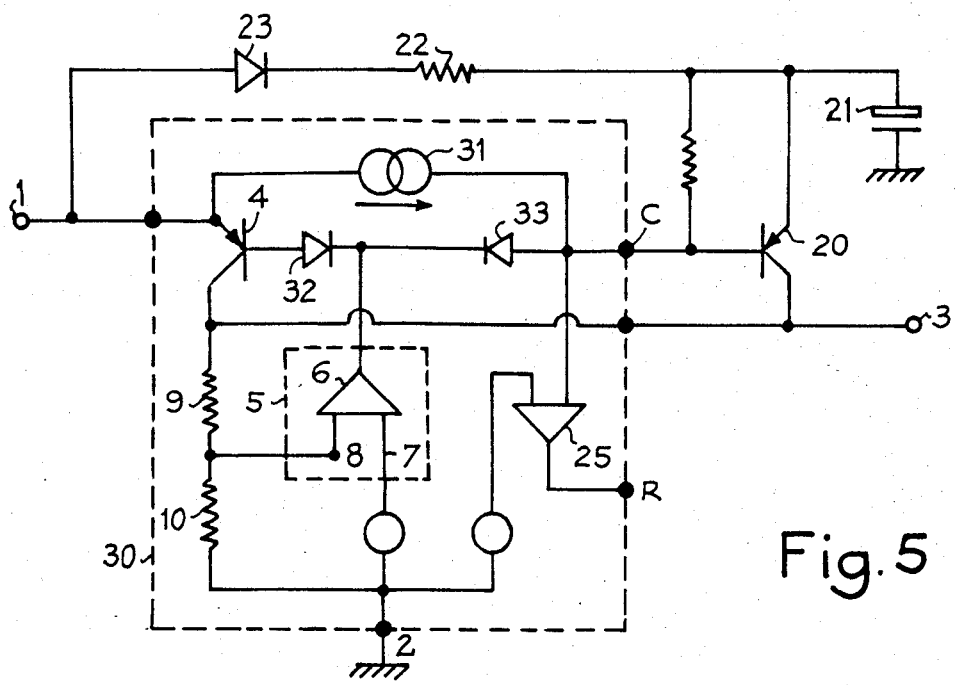
Figure 6:
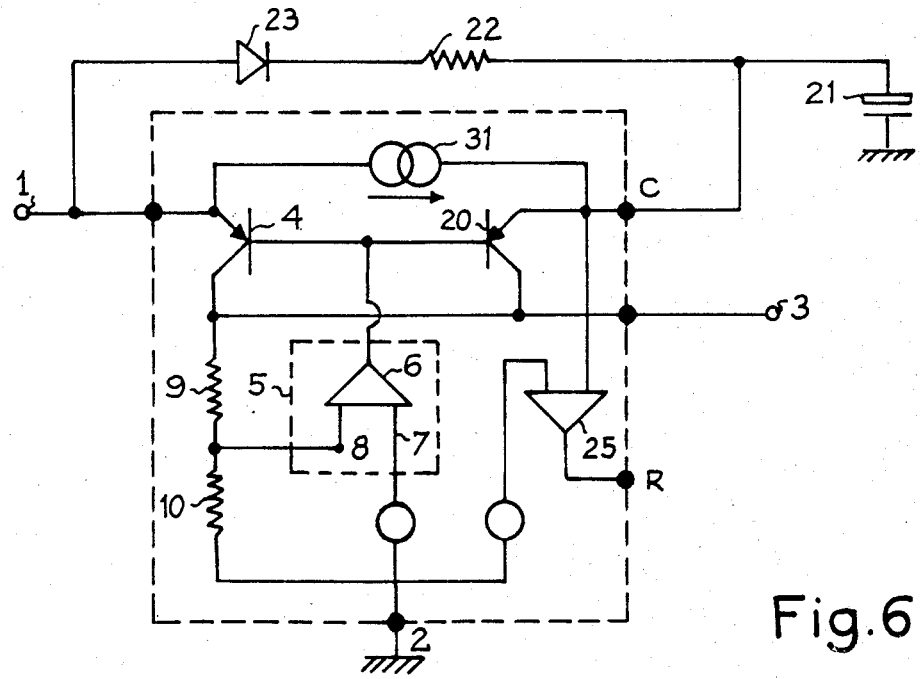

Special embodiments of the present invention in which details of the elements forming part of an integrated circuit and those external of said circuit are illustrated in FIGS. 5 and 6. These circuits are sometimes somewhat more complex than would be necessary in order to limit the number of connecting terminals. Thus, in an integrated circuit, the cost of providing a supplementary terminal is much higher than the cost of providing a few additional transistors. However, it must be borne in mind that pnp transistors are particularly expensive to produce in the form of an integrated circuit using conventional technology. For example, a 500 mA pnp transistor occupies a silicon surface of approximately 2 mm$^2$, whereas the remainder of the circuit described hereinafter in connection with FIG. 5, only occupies a surface of approximately 0.5 mm$^2$. However, it is desirable for the main pnp transistor, referred to hereinafter under reference numeral 4, to be constructed in the form of an integrated circuit, because pnp transistors produced in integrated form are able to withstand much higher negative interfering voltages than conventional discrete elements.

Thus, FIG. 5 shows an embodiment of the invention fulfilling all the functions of the circuit of FIG. 4, plus a few supplementary functions which will be defined hereinafter. In the circuit of FIG. 5, there is once again the input and output terminals 1 to 3, the pnp transistor 4 and the regulation system 5 to 10 (in addition, the reference voltage source for the regulation is shown by a circle). There is also the second pnp transistor 20, the storage capacitor 21, its load impedance 22 and the insulating diode 23. The other elements of the circuit are intended to be able to operate it in different configurations.

If use is made only of the elements appearing within the dotted line frame 30, this constitutes a group of integrable elements corresponding to a regulator with a low drop-out voltage and which makes it possible to supply a resetting signal. For this function, a power supply 31 is provided, together with a comparator 25 and two insulating diodes 32, 33. If, instead of using the second transistor according to the invention, capacitor 21 is directly connected to the access terminal C of the integrated circuit at the time of applying a voltage to terminal 1, the power supply charges with constant current capacitor 21, i.e. at the input of comparator 25 a voltage equal to the reference voltage is only obtained after a predetermined time lag. Thus, a delay signal is obtained at the output terminal R of comparator 25.

It is also possible to connect all the elements 20 to 23 in order to obtain an operation of the type described hereinbefore relative to FIG. 4. Thus, the circuit of FIG. 5 is an integrated circuit which can be produced in practice and which makes it possible to ensure various functions, in accordance with the wishes of the user. It should be noted that this circuit only has five access terminals.

FIG. 6 shows another embodiment of the invention, in which the two pnp transistors 4 and 20 are produced in the same integrated circuit. This is economically possible at present when excessively high power levels are not required, the pnp transistors then having reduced dimensions, e.g. in the case of the previously considered examples in which the circuit is intended to supply a microprocessor not requiring more than 150 mA supply current.

The circuit of FIG. 6 comprises the same five access terminals as that of FIG. 5, namely input and output terminals 1, 2, 3, terminal C for connection to the capacitor and the inhibition signal supply terminal R. Apart from the two pnp transistors 4 and 20, within the integrated circuit are provided comparator 5 and comparator 25 with their reference power supplies, together with resistors 9 and 10. There is also a low value power supply 31, connected between terminals 1 and C and whose function will be described hereinafter.

In normal operation, the storage capacitor 21 and resistors 22 and 23 are connected in the manner described hereinbefore and all the aforementioned functions are obtained, i.e. regulator with a low drop-out voltage, possibility of maintaining the use voltage in the case of an interruption to this power supply and the supply of a delay signal to terminal R.

If a user does not wish to benefit from the possibility of eliminating brief interruptions to the supply voltage by maintaining the possibility of having a delay signal, he need not use and connect resistor 22 and diode 23 and then only the low value capacitor 21 is used. The delay on putting into operation is ensured by the charging of capacitor 21 by the power supply 31. As a numerical example, the power supply can be 15 $\mu$A and capacitor 21 0.1 $\mu$F, whereas the storage capacitor must have a value of e.g. 47 F, so that it should be charged by a 470 times larger current in order to ensure the same time lag.

Moreover, in the case of the circuit according to FIG. 6, if it wished to increase the power available at terminal 3 and consideration is not given to the case where the voltage temporarily drops below a threshold voltage, terminal C can be connected to terminal 1. The two pnp transistors 4 and 20 then function in parallel and the power of the circuit is duplicated. Obviously, in this case, as capacitor 21 has not been connected, the signal available there at terminal R no longer has any significance.

What is claimed is:

1. A voltage regulator comprising an input; an output; and a ground line; a first PNP transistor having an emitter connected to said input, a collector connected to said output, and a base for receiving a regulation control voltage; a second PNP transistor having a collector connected to said output, a base for receiving said regulation control voltage, and an emitter; charging means connected between the emitter of said first transistor and the emitter of said second transistor; and a storage capacitor connected between the emitter of said second transistor and said ground line.

2. A regulator according to claim 1, wherein an insulating means, such as an insulating diode is connected in series with the charging means.

3. A regulator according to claim 1, wherein further comprising means for supplying an inhibition signal, when the capacitor is inadequately charged.

4. A regulator according to claim 3, wherein the means for supplying an inhibition signal comprise a comparator comparing the voltage of the capacitor with a reference voltage.

5. A regulator according to claim 4, wherein the means for supplying an inhibition signal also comprise means for the constant current charging of the capacitor.

6. A regulator according to claim 5, comprising on a single integrated chip the first PNP transistor, means for providing said regulation control voltage, a current source and a comparator supplying said inhibition signal.

7. A regulator according to claim 6, wherein it also comprises the second pnp transistor in the same integrated circuit.

* * * * *